US005561212A

United States Patent [19]

Pinkus et al.

[11] Patent Number: 5,561,212

[45] Date of Patent: *Oct. 1, 1996

[54] POLY(METHYLENE OXALATE), A NEW COMPOSITION OF MATTER

[75] Inventors: Alvin G. Pinkus, Robinson, Tex.; Rajan Hariharan, Hattiesburg, Miss.

[73] Assignee: Baylor University, Waco, Tex.

[*] Notice: The term of this patent shall not extend beyond the expiration date of Pat. No. 5,451,643.

[21] Appl. No.: 374,374

[22] Filed: Jan. 17, 1995

Related U.S. Application Data

[60] Continuation-in-part of Ser. No. 305,170, Sep. 13, 1994, Pat. No. 5,426,218, which is a division of Ser. No. 27,134, Mar. 5, 1993, Pat. No. 5,371,171.

[51] Int. Cl.$^6$ .................................................. C08G 63/02
[52] U.S. Cl. .......................... 528/272; 528/275; 528/288
[58] Field of Search .............................. 562/578; 528/271, 528/230, 247, 397, 422, 272, 275, 288

[56] References Cited

U.S. PATENT DOCUMENTS

| | | | |
|---|---|---|---|
| 2,071,250 | 2/1937 | Carothers | 260/106 |
| 2,071,251 | 2/1937 | Carothers | 18/54 |
| 2,111,762 | 3/1938 | Ellis | 260/8 |
| 4,130,639 | 12/1978 | Shalaby et al. | 424/78 |
| 4,141,087 | 2/1979 | Shalaby et al. | 3/1 |
| 4,208,511 | 6/1980 | Shalaby et al. | 528/272 |
| 4,210,668 | 7/1980 | Hay | 424/298 |
| 5,008,137 | 4/1991 | Nugent, Jr. et al. | 428/35.4 |
| 5,286,728 | 2/1994 | Ferrini | 514/255 |

FOREIGN PATENT DOCUMENTS 3306089 2/1983 Germany.

OTHER PUBLICATIONS

Carothers et al., "Studies on Polymerization and Ring Formation. V. Glycol Esters of Oxalic Acid," *J. Am. Chem. Soc.*, 52:3292–3300, 1930.

Cimecioglu and East, "Poly(methylene Sebacate)*:Synthesis and Characterization," *J. Polym. Sci. Polym. Chem. Ed.*, 30:313–321, 1992.

Cimecioglu et al., "The Synthesis and Characterization of Poly(methylene Terephthalate)," *J. Polym. Sci. Chem. Ed.*, 26:2129–2139, 1988.

Coquard et al., "Bioresorbable Surgical Product," *Chem. Abstr.*, vol. 84, Abstract No. 84:111702j, 1976.

East and Morshed, "The Preparation of Poly(methylene esters)," *Polymer*, 23:1555–1557, 1982.

East and Morshed, "High Molecular Weight Polyesters from Alkali Metal Dicarboxylates and α,ω–Dibromo Compounds," *Polymer*, 23:168–170, 1982.

Shelley, Suzanne, "Wanted: The Perfect Asbestos Substitute," *Chemical Engineering*, pp. 59 & 61, 1993.

Kvick and Liminga, "Structure of Methylene Oxalate," *Acta Cryst.*, B36:734–736, 1980.

Dialog Search Report, 1992.

Cimecioglu and East, "Synthesis and Characterization of Linear Aliphatic Poly(methylene dicarboxylate)s from Caesium Dicarboxylates and Bromochloromethane," *Makromol. Chem., Rapid Commun.* 10:319–324, 1989.

Hariharan and Pinkus, "Useful NMR Solvent Mixture for Polyesters: Trifluoroacetic Acid–d/chloroform–d," *Polymer Bulletin* 30:91–95, 1993.

Hariharan and Pinkus, "$^1$H and $^{13}$C NMR Solution Spectra and Molecular Weights by End Group Analysis of Relatively Insoluble Polyesters: Polyglycolide, Poly(ethylene terephthalate), Polyhydroxymethylbenzoate and Poly (p-xylene terephthalate), Using a Trifluoroacetic Acid–d/Chloroform–d Mixture," *Polymer Preprints*, 34(1):861–862, 1993.

Makarevich and Sushko, "Spectroscopic manifestation of properties of some ammonium salts," Search regarding: IR and Raman Spectra, 1993.

Nishikubo and Ozaki, "Synthesis of Polymers by the Reaction of Dicarboxylic Acids with Alkyl Dihalides Using the DBU Method," *Polymer Journal*, 22(12):1043–1050, 1990.

"Crosslinked Vinyl Chloride Resin Foam Compositions," Search regarding: Title components of highly resilient foams, 1993.

Economy and Cottis, "Hydroxybenzoic Acid Polymers," *In: Encyclopedia of Polymer Science and Technology*, vol. 15, pp. 292–306, 1971.

Mathias et al., "A Simple One–Step Synthesis of Unsaturated Copolyesters," *J. Appl. Polym. Sci.*, 38:1037–1051, 1089.

Pétiaud et al., "A $^1$H and $^{13}$C n.m.r. study of the products from direct polyesterification of ethylene glycol and terephthalic acid," *Polymer*, 33(15), 3155–3161, 1992.

Pinkus et al., "Polyesters with Aromatic Groups in the Backbone from Reactions of 3– and 4–Bromomethylbenzoic Acids with Triethylamine," J. M. S.– *Pure Appl. Chem.*, A29(11), 1031–1047, 1992.

Pinkus and Subramanyam, "New High–Yield, One–Step Synthesis of Polyglycolide from Haloacetic Acids," *Journal of Polymer Science: Polymer Chemistry Edition*, 22:1131–1140, 1984.

Pham et al., *In: Proton & Carbon NMR Spectra of Polymers*, p. 197, CRC Press, Boca Raton, FL, 1991.

International Search Report, mailed Aug. 16, 1994.

Gordon et al., "Hydrodegradable Copolyester by Simple Transesterification: PBT–co–Polyoxalate," *Polym. Prepr. Am. Chem. Soc., Div. Polym. Chem.*, 31:507–508, 1990.

(List continued on next page.)

*Primary Examiner*—Paul J. Killos
*Assistant Examiner*—Rosalynd Williams
*Attorney, Agent, or Firm*—Arnold, White & Durkee

[57] ABSTRACT

A poly(methylene oxalate) polymer, [poly(oxy(1,2-dioxo-1,2-ethanediyl)oxymethylene)], a bis(tetrabutylammonium) oxalate salt, methods of synthesis thereof and methods of use are provided. Poly(methylene oxalate) is nearly insoluble in all common organic solvents, does not melt and is resistant to fire. Applications are as a light-weight material for use at high temperatures, e.g., as a structural material in aircraft and space vehicles, as a binder for brake systems, and as an insulator for microelectronic components.

20 Claims, 3 Drawing Sheets

OTHER PUBLICATIONS

Pinkus et al., "Preparation of Polymandelide by Reaction of α–Bromophenylacetic Acid and Triethylamine," *J. Polym. Sci. Part A., Polym. Chem.*, 27:4291–4296, 1989.

Piraner et al., "Thermotropic Polyesters, 8[a)] Comparison of Two Methods of Synthesis of Regular Liquid–Crystalline Multiblock Copolymers," *Makromol. Chem., 193:681–686, 1992.*

Thibeault et al., "Unsaturated Polyoxalates: Synthesis and Mass Spectral Study of Their Thermal Behavior," *J. Polymer Sci., Part A: Polym. Chem.*, 28:1361–1376, 1990.

POLY(METHYLENE OXALATE), A NEW COMPOSITION OF MATTER

This is a continuation-in-part of U.S. Ser. No. 08/305,170, filed Sep. 13, 1994 issued Jun. 20, 1995 as U.S. Pat. No. 5,426,218; which is a division of Ser. No. 08/027,134, filed Mar. 5, 1993, issued Dec. 6, 1994 as U.S. Pat. No. 5,371,171.

BACKGROUND OF THE INVENTION

Polyoxalates have been previously prepared by ester interchange with diols such as ethylene glycol, 1,3-propanediol, or 1,4-butanediol with diethyloxalate [Carothers et al., *J. Am. Chem. Soc.*, 52, 3292 (1930);Gordon et al., *Polym. Prepr.* (*Am. Chem. Soc., Div. Polym. Chem.*) 31, 507 (1990); Thibeault et al., *J. Polym. Sci., Pt. A: Polym. Chem.*, 28, 1361 (1990); Shalaby et al., U.S. Pat. No. 4,141,087 (1979)], by reactions of oxalic acid with alkylene glycols [Ellis, U.S. Pat. No. 2,111,762 (1938)], and by condensations of diols with oxaloyl chloride [Piraner et al., *Makromol. Chem.*, 193, 681 (1992)]. Linear polyesters have also been prepared by reactions of dicarboxylic acids and diols [Carothers, U.S. Pat. Nos. 2,071,250 and 2,071,251].

Poly(methylene sebacate) was synthesized via a reaction of cesium sebacate with bromochloromethane (Cimecioglu et al., *Journal of Polymer Science: Part A: Polymer Chemistry*, 30:313–321 (1992)), similarly, poly(methylene terephthalate) was synthesized via a reaction of cesium or potassium terephthalate with dibromomethane or bromochloromethane (Cimecioglu et al., *Journal of Polymer Science: Part A: Polymer Chemistry* 26:2129–2139 (1988)). East and Morshed (*Polymer*, (1982) vol. 23:168–170 and 1555–1557) have accomplished the synthesis of poly(methylene esters).

Ever since health concerns about asbestos began to surface, producers have been driven to develop suitable alternatives. Traditionally, asbestos has been woven into cloths and garments, compressed into boards, gaskets, and pipe coverings, and used as a filler and reinforcement in paint, asphalt, cement and plastic. To date, no single product has emerged that is as inexpensive, inert, strong or incombustible as asbestos.

The poly(methylene oxalate) (PMO), {systematic name: poly[oxy(1,2-dioxo-1,2-ethanediyl) oxymethylene]}, of the present invention cannot be prepared by any of the methods described above because the glycol that would be needed ($HOCH_2OH$) is not stable under normal conditions, but decomposes into formaldehyde and water.

The present invention provides poly(methylene oxalate), (PMO), a new composition of matter having unusual properties, and the synthesis thereof. PMO is resistant to high temperatures and the action of organic solvents, and would be useful in the formulation of objects that are non-flammable, for example.

SUMMARY OF THE INVENTION

The present invention provides for a poly(methylene oxalate), (PMO), polymer having the formal name, poly [oxy(1,2-dioxo- 1,2-ethanediyl) oxymethylene], and having the following structure with end groups X:

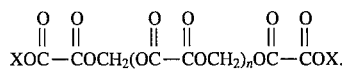

The end group X is a positive counterion. A positive counterion is an ion that balances the charge of a negative ion and, in the present application, may be a metal cation, tetraalkylammonum cation, in particular, a tetrabutylammonium cation, a quaternary ammonium cation, or the like. The metal cation may be $Na^+$, $K^+$, $Li^+$ or $Rb^+$. Other counterions attachable to poly(methylene oxalate) matrix are also considered part of the present invention and may be prepared by routine derivatization and/or exchange methods well known to those of skill in the art in light of the present disclosure.

The subscript "n" in the above structural formula is the number of repeating units and is an integer greater than one. The designation "n" also refers to the degree of polymerization. Because of the insolubility of PMO in common solvents, it is not possible to obtain molecular weight data for estimating the upper limit for "n." However, the present inventors were able to obtain molecular weight data on material formed early in the reaction and that dissolved in a trifluoroacetic acid-deuteriochloroform mixture. That data indicates a value for "n" of about 830 and extrapolates to a number average molecular weight of about 85,000. This material was collected at 2.5 h whereas the reaction has been carried out for 6 hours and up to 4 days. Where the monomeric precursor is present in excess, it is safe to assume that the reaction is linear with time and "n" may reach values greater than 1000 or 10,000 or even 50,000. The upper limit is unimportant, however, since the PMO having the herein-stated properties is produced readily. The present invention contemplates values of "n" greater than 1, preferably greater than 100, more preferably greater than 500, even more preferably greater than 1000 and most preferably, greater than 5000.

A precursor molecule to the poly(methylene oxalate) polymer is also an aspect of the present invention and has the structure

where $R^1$, $R^2$, $R^3$ and $R^4$ are butyl or $R^1$, $R^2$ and $R^3$ are methyl and $R^4$ is benzyl or an alkyl larger than butyl, for example, hexadecyl.

A further aspect of the present invention is a method for preparing poly(methylene oxalate). The method comprises reacting bis($R^1R^2R^3R^4$ ammonium) oxalate or a metal oxalate with methylene chloride, methylene bromide or methylene iodide in a mutual solvent to form a poly(methylene oxalate) precipitate. The metal oxalate may be sodium, potassium, lithium or rubidium oxalate. $R^1$, $R^2$, $R^3$ and $R^4$ may be alkyl or arylalkyl, such as benzyl, for example. They are not all methyl or not all ethyl. The method may further include the steps of collecting the precipitate and removing unreacted reagents. In this method for preparing poly(methylene oxalate), $R^1$, $R^2$, $R^3$ and $R^4$ are butyl or $R^1$, $R^2$ and $R^3$ are methyl and $R^4$ is benzyl or hexadecyl.

A preferred embodiment of the present invention is a method for preparing poly(methylene oxalate) comprising the steps of forming a bis(tetraalkylammonium) oxalate salt and reacting this salt with methylene chloride, methylene bromide, bromochloromethane or methylene iodide to form poly(methylene oxalate). The bis(tetraalkylammonium) oxalate salt may be a bis(tetrabutylammonium) oxalate salt.

A further embodiment of the present invention is an asbestos substitute comprising poly(methylene oxalate). A preferred form for an asbestos substitute is a fibrous form. Such fibrous material may be made, for example, by sintering the poly(methylene oxalate).

DESCRIPTION OF THE PREFERRED EMBODIMENTS

Figure 1:
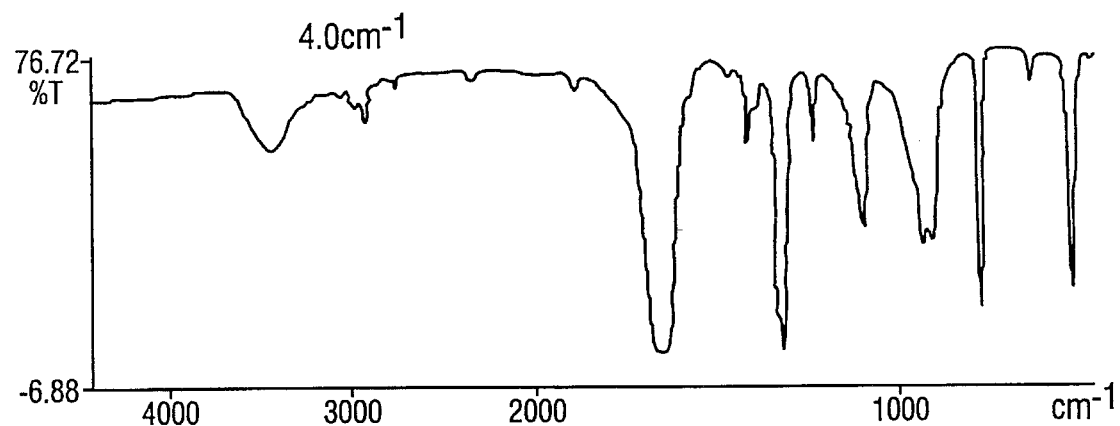
FIG. 1 shows the infrared spectrum of poly(methylene oxalate) using KBr pressed pellet: cm$^{-1}$%; 2981 62.11, 2922 58.26, 1657 00.33, 1325 2.01, 1098 33.50, 934.5 28.61.

Poly(methylene oxalate) {systematic name: poly[oxy(1,2-dioxo- 1,2-ethanediyl)oxymethylene]} has been synthesized. This polymer has unique properties that make it suitable for various applications. It is not very soluble in any of the common organic solvents, it does not melt, it is nonflammable, and it is resistant to fire. The proof of structure of the material is from its infrared spectrum which shows carbonyl, carbon-oxygen single bond, and carbon-hydrogen stretching bands in predicted positions (see FIG. 1).

Possible applications are as a light-weight material for use at high temperatures (for example, as a structural material in aircraft and space vehicles, as a binder for brake systems, and an insulator for microelectronic components); as a material for incorporation into objects to enhance their fire-resistance (for example, into plastics used for making furniture); as an asbestos substitute, and as a material from which to make objects that will not dissolve in various solvents, especially for industrial uses. PMO may also be used as a heat-resistant coating for nose cones employed for space reentry vehicles.

Under a nitrogen atmosphere, poly(methylene oxalate) does not begin to decompose until the temperature reaches about 430° C. On heating with a Bunsen burner flame, it sinters but does not burn. This sintering or fusing together at high temperatures forms PMO fibers useful in the afore-described applications.

PMO hydrolyzes slowly on stirring with sodium hydroxide solution for a period of several hours. For example, by placing PMO overnight in about 15% NaOH, the polymer will go into solution. Poly(methylene oxalate) is also unusual in that it contains a very high percentage of oxygen (nearly 63%) and yet, is very stable.

The overall synthesis of PMO consists of the following steps:

(1) conversion of oxalic acid into a metal oxalate salt or a bis(tetraalkylammonium) salt;
(2) removal of water and solvent;
(3) reaction of the salt with a methylene halide dissolved in appropriate solvents; and
(4) separation of byproduct metal halide or tetra-alkylammonium halide from the polymer.

Thus, oxalic acid is reacted with two equivalents of a tetra-alkylammonium hydroxide to form a bis(tetraalkylammonium) salt in solution:

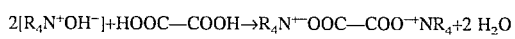

The solvent and water are removed to form the anhydrous oxalate salt which is then heated in a solvent with a methylene halide:

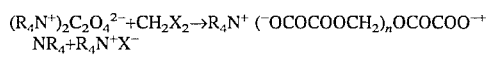

The precipitated polymer is separated from the solvent, for example, by centrifugation or filtration and residual tetra-alkylammonium halide is separated from poly(methylene oxalate) by washing the precipitate with methanol. The tetra-alkylammonium halide is recovered by removal of solvents.

Metal cation end groups may be attached to the polymer by converting oxalic acid to a metal oxalate and reacting the metal oxalate with a methylene halide as follows:

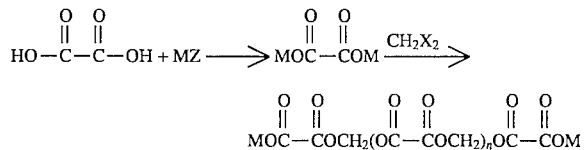

M=metal (Group I: Na$^+$, K$^+$, Li$^+$, Rb$^+$)
Z=OH$^-$, CO$_3^{2-}$, HCO$_3^-$
X=Cl, Br, or I The polymer having metal cation end groups is recovered as described above.

Preparation of Bis(tetrabutylammonium) Oxalate

Figure 2:
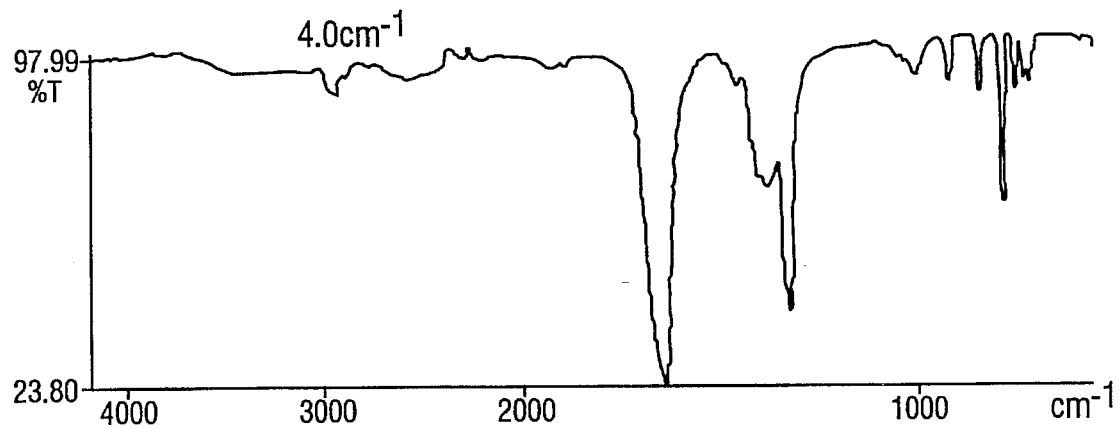
FIG. 2 shows the infrared spectrum of bis(tetrabutylammonium) oxalate obtained in CDCl$_3$ using NaCl salt plate: cm–1%; 2932.2 87.84, 1641.0 23.72, 1325.3 40.53, 914.7 88.54, 833.9 83.00, 779.4 58.85, 744.8 87.65.
Figure 3:
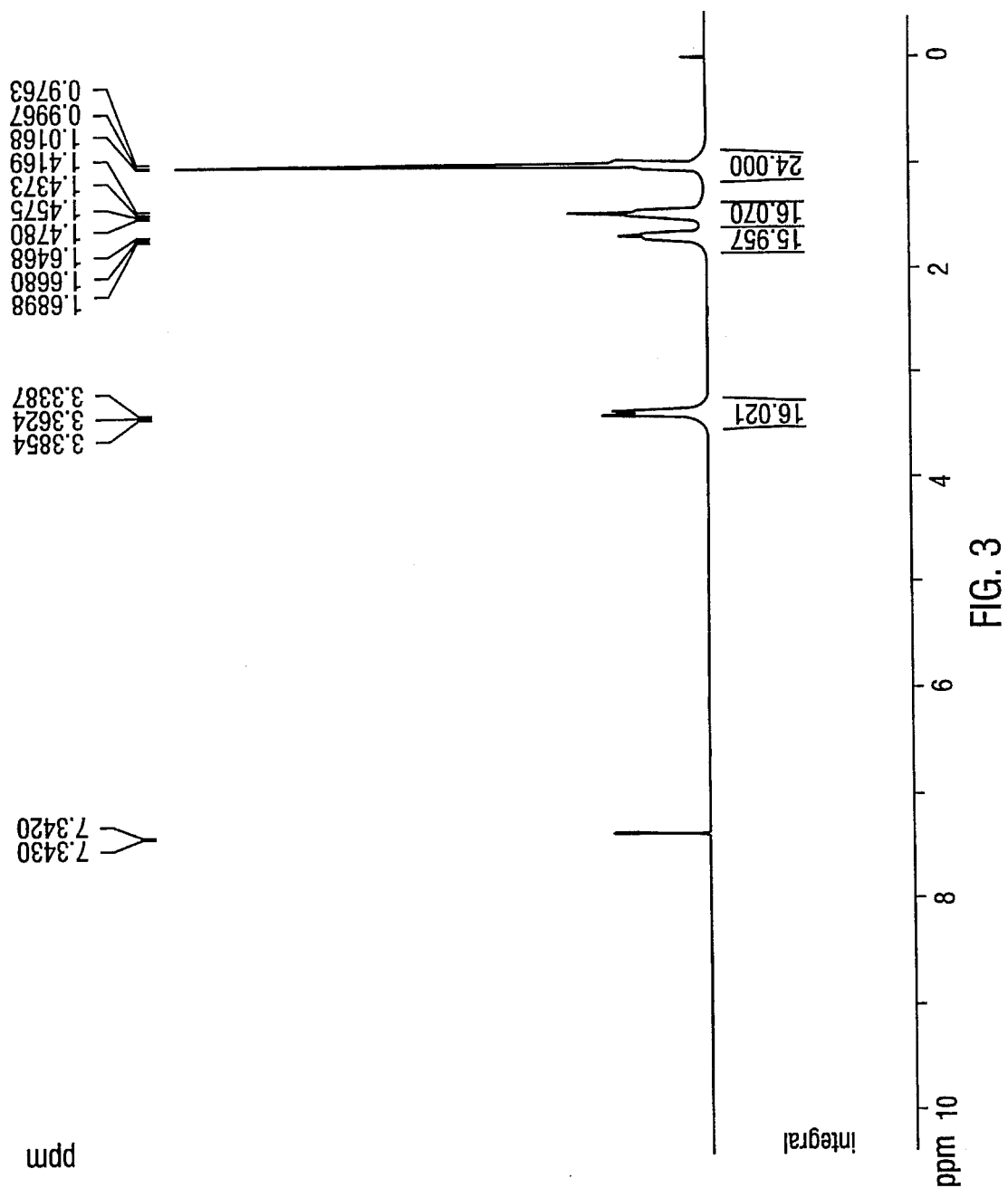
FIG. 3 shows the $^1$H NMR spectrum of bis(tetrabutylammonium) oxalate in CDCl$_3$.
Figure 4:
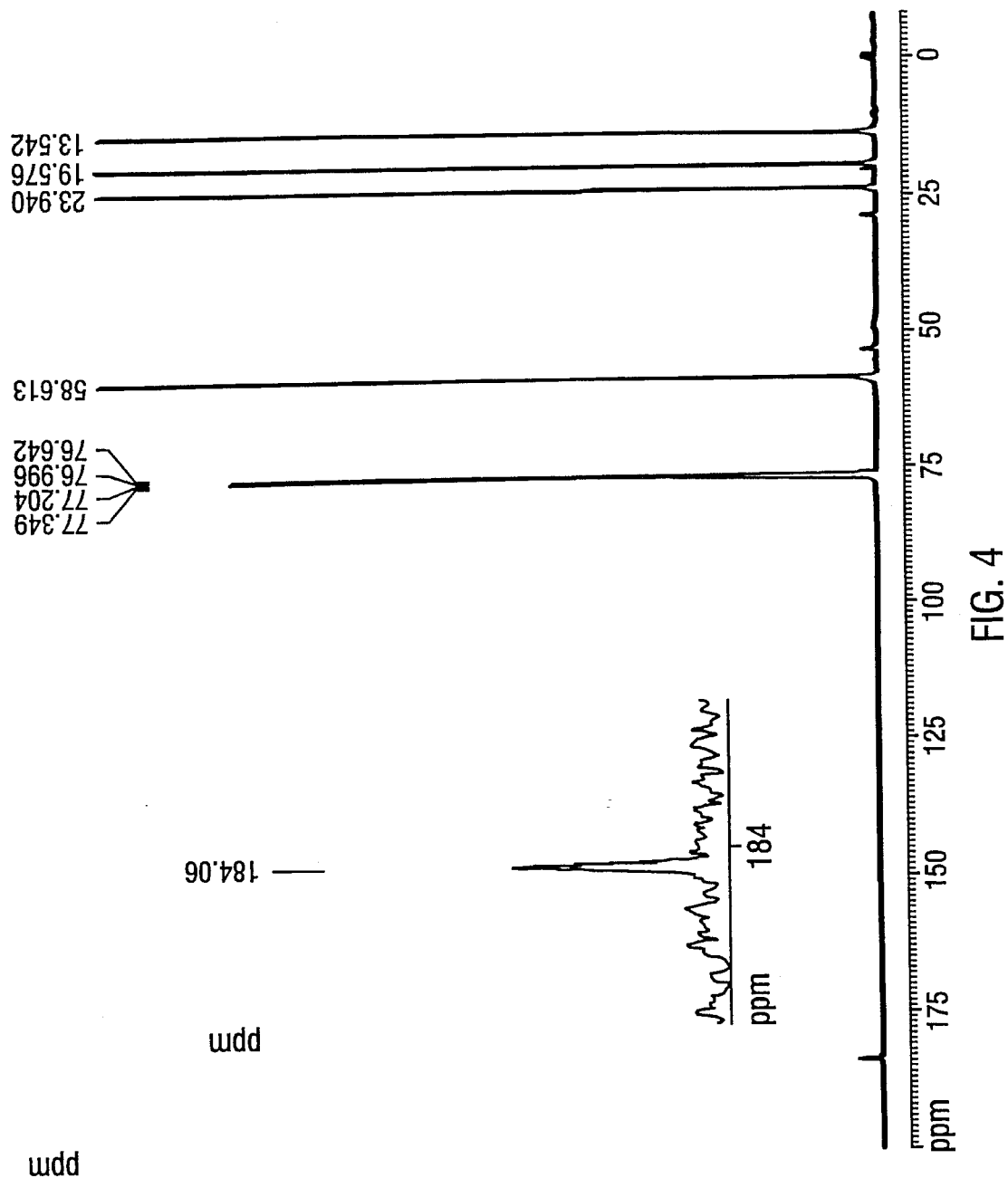
FIG. 4 shows the $^{13}$C NMR spectrum of bis(tetrabutylammonium) oxalate in CDCl$_3$.

Tetrabutylammonium hydroxide in methanol (90 mL of a 1 molar solution, 0.098 mol) was added dropwise to 3.5 g (0.039 mol) of anhydrous oxalic acid under an argon atmosphere. The end-point was determined by titration. The solvent was removed in vacuo and the residue was dried in vacuo at 40° C. for 4 h and then at 60° C. for 9.5 h. A yield of 21 g of product was obtained. The product was characterized as bis(tetrabutylammonium) oxalate by means of its $^1$H and $^{13}$C NMR and IR spectra (FIG. 2–FIG. 4). Manipulations with bis(tetrabutylammonium) oxalate were carried out in a dry glove-box in inert atmospheres (nitrogen or argon) since the compound is very hygroscopic. Bis(tetrabutylammonium) oxalate is a new composition of matter as well as are most of the other bis(tetraalkylammonium) oxalates, an exception being tetraethylammonium oxalate. Other tetraalkylammonium oxalates may be analogously used in place of tetrabutylammonium oxalate to prepare PMO. Such compounds may also be used as substrates or inhibitors of oxalate metabolizing enzymes.

Preparation of Poly(methylene oxalate) (PMO) From Methylene Bromide or Methylene Chloride Bis(tetrabutylammonium) oxalate (12 g; 0.021 mol) was dissolved in 25 mL of chlorobenzene and methylene bromide (2.6 mL; 4.0 g; 0.023 mol) was added. Other solvents such as nitrobenzene, bromobenzene, and N-methylpyrrolidone, for example, may be used in place of chlorobenzene. The solution was heated at reflux for about 6.3 h and allowed to cool to room temperature. A white precipitate formed and was isolated by centrifugation. It was then washed three times with 50 mL portions of methanol to remove tetrabutylammonium bromide and unreacted starting materials, and dried in vacuo for about 2 days. The poly(methylene oxalate) product weighed 0.29 g. PMO is not very soluble in any of the common organic solvents, however, it dissolved in concentrated sulfuric acid. A $^{13}C$ NMR spectrum of the acid solution showed carbonyl and methylene carbon signals at lower and higher field positions, respectively. The polymer did not reprecipitate when the sulfuric acid solution was poured into cold water. An infrared spectrum with a sample of the polymer in a pressed KBr pellet showed absorption peaks for C—H, C=O, and C—O stretching and C—H bending vibrations (FIG. 1). In a differential scanning calorimeter (DSC), PMO did not melt on heating to about 410° C., at which temperature it began to decompose.

Byproduct tetrabutylammonium bromide (12 g) was recovered from the above filtrate (from PMO) by evaporation of chlorobenzene and methanol solvents. A $^1H$ NMR spectrum on the compound in $CDCl_3$ showed the expected four groups of peaks for the butyl group. Tetrabutylammonium bromide can be recycled back into tetrabutylammonium hydroxide by passage through an anionic exchange column to exchange hydroxide for the bromide ion or directly into bis(tetrabutylammonium) oxalate.

Other tetraalkylammonium hydroxides ($R_4N^+OH^-$ and $R^1R^2R^3R^4N^+OH^-$) may be used to prepare the bis(tetraalkylammonium) oxalates. However, bis(tetramethylammonium) oxalate appears to be too insoluble and bis(tetraethylammonium) oxalate forms a very dark-colored mixture. Arylalkyltrimethylammonium compounds (such as benzyltrimethylammonium and hexadecyltrimethylammonium) may be used as well.

The synthesis procedure using methylene chloride was similar to that described above with methylene bromide; the procedure used 8.8 g (0.015 mol) of bis(tetrabutylammonium) oxalate, 25 mL chlorobenzene solvent, and 1.1 mL (1.5 g, 0.017 mol) of methylene chloride. The solution was heated at 85° C. (external oil bath temperature) for 4 days, during which time a white precipitate had formed. The weight of polymer isolated by the same procedure described above was 0.22 g.

On evaporation of the solvents from the filtrate and drying of the residue in vacuo, 8.9 g. of tetrabutylammonium chloride was isolated and characterized by its $^1H$ NMR spectrum. Tetrabutylammonium chloride can also be recycled. Bromochloromethane or methylene iodide may be used as the methylene halide in addition to methylene bromide or methylene chloride.

Other methods of synthesis of PMO were attempted; for example, when the present inventors tried to synthesize PMO by reacting oxalic acid and methylene bromide (or methylene chloride) with triethylamine, a method analogous to that which was successful in the synthesis of polyglycolide [A. G. Pinkus and R. Subramanyam, J. Polym. Sci., Polym. Chem. Ed., 22, 1131 (1984)], polymandelide [A. G. Pinkus, R. Subramanyam, S. L. Clough, and T. C. Lairmore, J. Polym. Sci. Part A. Polym. Chem., 27, 4291 (1989)], and polyhydroxymethylbenzoates [A. G. Pinkus, R. Subramanyam, and R. Hariharan, J. Macromol. Sci.-Pure Appl. Chem., A29, 1031 (1992)], the reaction did not take place.

Determination of $M_n$ of Soluble Lower Molecular Weight PMO

The reaction conditions were those described in the synthesis of poly(methylene oxalate). After heating the reaction mixture for 2.5 h., a solid that had formed on the sides of the reaction flask was isolated and washed with methanol. After drying in vacuo, a sample of the product was partially dissolved in a trifluoroacetic acid-deuteriochloroform mixture. A $^1H$ NMR spectrum was run on the solution. The degree of polymerization (DP) or the value of n in the formula, $—(CH_2OCOCOO)_n—$, was determined on this soluble lower molecular weight fraction using end-group analysis and was calculated to be 830. The corresponding value for the molecular weight of this material is about 85,000. This value represents a number average molecular weight for the fraction that is soluble after a short heating period. Molecular weight values for the higher molecular weight material are not possible to determine due to the insolubility of PMO, but is expected to be considerably higher.

Preparation of Poly(alkylene dicarboxylates)

Based on the synthesis of poly(methylene oxalate), dicarboxylic acids (such as terephthalic, isophthalic, dimethylmalonic, malonic, succinic, adipic, fumaric, etc.) are first converted into the corresponding bis(tetraalkylammonium) dicarboxylates by reaction of the dicarboxylic acid $HO_2CRCO_2H$ (where R is an aliphatic or aromatic moiety) with two equivalents of tetraalkylammonium hydroxide:

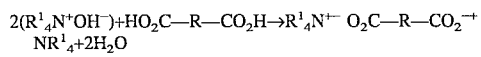
$2(R^1_4N^+OH^-)+HO_2C—R—CO_2H \rightarrow R^1_4N^{+-}O_2C—R—CO_2^{-+}NR^1_4+2H_2O$ The bis(tetraalkylammonium) dicarboxylate is then reacted with an alkylene dihalide such as alkylene bromide or alkylene chloride to form the poly(alkylene dicarboxylate) as described for poly(methylene oxalate):

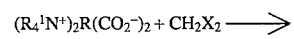
$(R_4^1N^+)_2R(CO_2^-)_2 + CH_2X_2 \longrightarrow$

$R_4^1N^+(^-OCORCOOCH_2)_nOCORCOO^{-+}NR_4^1 + R_4^1N^+X^-$

X = Cl or Br or I

Copolymers of poly(alkylene dicarboxylates) may be obtained by reacting the bis(tetraalkylammonium) dicarboxylate salt with a mixture of alkylene halides such as methylene or ethylene halide. The properties of the copolymers can be varied by changing the ratio of alkylene halides in the mixture. Similarly, a mixture of dicarboxylate salts my yield copolymers with desired properties.

The pertinent parts of the following references are incorporated by reference herein.

REFERENCES

Carothers et al., *J. Am. Chem. Soc.*, 52, 3292 (1930).

Carothers, U.S. Pat. No. 2,071,251.

Carothers, U.S. Pat. No. 2,071,250.

Cimecioglu et al., *Journal of Polymer Science: Part A: Polymer Chemistry*, 26: 2129–2139 (1988)

Cimecioglu et al., *Journal of Polymer Science: Part A: Polymer Chemistry*, 30: 313–321 (1992)

East and Morshed, *Polymer*, 23:168–170 and 1555–1557 (1982).

Ellis, U.S. Pat. No. 2,111,762 (1938).

Gordon et al., *Polym. Prepr. Am. Chem. Soc., Div. Polym. Chem.*, 31, 507 (1990)

Pinkus et al., *J. Polym. Sci., Polym. Chem. Ed.*, 22, 1131 (1984).

Pinkus et al., *J. Polym. Sci. Part A. Polym. Chem.*, 27, 4291 (1989).

Pinkus et al., *J. Macromol. Sci.-Pure Appl. Chem.*, A29, 1031 (1992).

Piraner et al., *Makromol. Chem.*, 193, 681 (1992).

Shalaby et al., U.S. Pat. No. 4,141,087 (1979).

Thibeault et al., *J. Polym. Sci., Pt. A: Polym. Chem.*, 28, 1361 (1990).

What is claimed is:

1. Poly [oxy(1,2-dioxo-1,2-ethanediyl)oxymethylene].

2. A polymer having the structure

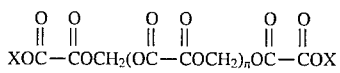

where X is a positive counterion and n is an integer greater than 1.

3. The polymer of claim 2 where the positive counterion is a tetraalkylammonium ion.

4. The polymer of claim 2 where the positive counterion is a quaternary ammonium cation.

5. The polymer of claim 3 where the tetraalkylammonium ion is a tetrabutylammonium ion.

6. The polymer of claim 2 where the positive counterion is a metal cation.

7. The polymer of claim 6 wherein the metal cation is $Na^+$, $K^+$, $Li^+$ or $Rb^+$.

8. The polymer of claim 2 where n is an integer greater than 100.

9. The polymer of claim 2 where n is an integer greater than 500.

10. The polymer of claim 2 where n is an integer greater than 1000.

11. The polymer of claim 2 where n is an integer greater than 5000.

12. A polymer having the structure

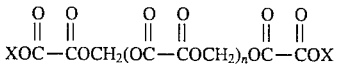

where X is a tetraalkylammonium ion and n is an integer greater than 1.

13. A polymer having the structure

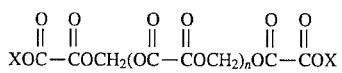

where X is a tetrabutylammonium ion and n is an integer greater than 1.

14. A polymer having the structure

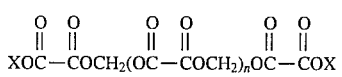

where X is a metal cation and n is an integer greater than 1.

15. The polymer of claim 14 where the metal cation is $Na^+$, $K^+$, $Li^+$ or $Rb^+$.

16. A method for preparing poly(methylene oxalate), comprising:

reacting bis($R^1R^2R^3R^4$ ammonium) oxalate or a metal oxalate with methylene chloride, methylene bromide, methylene iodide or bromochloromethane in a mutual solvent to form a poly(methylene oxalate) precipitate where $R^1$, $R^2$, $R^3$ and $R^4$ are alkyl or arylalkyl and $R^1$, $R^2$, $R^3$ and $R^4$ are not all methyl or not all ethyl and where the metal is $Na^+$, $K^+$, $Li^+$ or $Rb^+$.

17. The method of claim 16 where $R^1$, $R^2$, $R^3$ and $R^4$ are butyl.

18. The method of claim 16 where the mutual solvent is chlorobenzene, nitrobenzene, bromobenzene or N-methylpyrrolidone.

19. An asbestos substitute comprising poly(methylene oxalate).

20. The asbestos substitute of claim 19 where the poly(methylene oxalate) is in a fibrous form.

* * * * *